United States Patent
Neerju et al.

(10) Patent No.: US 11,394,755 B1
(45) Date of Patent: Jul. 19, 2022

(54) GUIDED HARDWARE INPUT PROMPTS

(71) Applicant: International Business Machines Corporation, Armonk, NY (US)

(72) Inventors: Neerju Neerju, Chelmsford, MA (US); Mukesh Muraleedharan Nair, Chelmsford, MA (US); Jeremy R. Fox, Georgetown, TX (US); Zachary A. Silverstein, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/340,189

(22) Filed: Jun. 7, 2021

(51) Int. Cl.
| | |
|---|---|
| *H04L 65/403* | (2022.01) |
| *H04L 65/1083* | (2022.01) |
| *G08B 7/06* | (2006.01) |
| *G06F 3/16* | (2006.01) |
| *G06F 40/289* | (2020.01) |

(52) U.S. Cl.
CPC ............ *H04L 65/1086* (2013.01); *G08B 7/06* (2013.01); *H04L 65/403* (2013.01); *G06F 3/167* (2013.01); *G06F 40/289* (2020.01)

(58) Field of Classification Search
CPC ................................................ H04L 65/00–80
See application file for complete search history.

(56) References Cited

U.S. PATENT DOCUMENTS

| | | | | |
|---|---|---|---|---|
| 8,849,675 B1* | 9/2014 | Foerster | ................. | G10L 15/22 704/275 |
| 9,420,013 B1* | 8/2016 | van Rensburg | ......... | H04L 67/42 |
| 9,524,492 B2* | 12/2016 | Jang | ..................... | G06Q 10/109 |
| 10,318,034 B1* | 6/2019 | Hauenstein | ........... | G06F 3/0486 |
| 10,848,805 B1* | 11/2020 | Mattar | ............. | H04N 21/47202 |
| 2003/0158731 A1* | 8/2003 | Falcon | .................... | G10L 15/06 704/231 |
| 2007/0006082 A1* | 1/2007 | Potter | .................... | G10L 15/22 715/728 |
| 2008/0129528 A1* | 6/2008 | Guthrie | ................. | G09B 5/062 340/686.1 |

(Continued)

FOREIGN PATENT DOCUMENTS

| | | |
|---|---|---|
| CN | 102137178 B | 7/2013 |
| DE | 602005003962 | 1/2008 |
| TW | 623957 B | 5/2018 |

OTHER PUBLICATIONS

Disclosed Anonymously, et al., "Method and System for Enabling Holographic Interaction of Objects during Video Conference", ip.com Prior Art Database Technical Disclosure, IPCOM000258824D, Jun. 18, 2019, 5 pgs.

(Continued)

*Primary Examiner* — Mohamed A. Wasel
*Assistant Examiner* — Julian Chang
(74) *Attorney, Agent, or Firm* — Alexander G. Jochym

(57) ABSTRACT

Two or more computing devices involved in a software based conference are determined. Each computing device of the two or more computing devices has an associated user. An input from a computing device of the two or more computing devices is received. A user action for a user associated with a computing device of the two or more computing devices from the input is determined. Whether the user completed the user action within a threshold is determined. The user is alerted of the user action.

17 Claims, 3 Drawing Sheets

(56) References Cited

U.S. PATENT DOCUMENTS

| | | | |
|---|---|---|---|
| 2008/0147803 A1* | 6/2008 | Krzyzanowski | H04L 51/043 709/206 |
| 2008/0147826 A1* | 6/2008 | Velusamy | H04L 65/1059 709/219 |
| 2008/0215691 A1* | 9/2008 | Chhatrapati | G06Q 10/1095 707/999.002 |
| 2009/0033472 A1* | 2/2009 | Fotuhi | G04G 11/00 340/309.7 |
| 2009/0097625 A1 | 4/2009 | Peters | |
| 2009/0121887 A1* | 5/2009 | Fong | H02H 3/335 340/650 |
| 2009/0319898 A1* | 12/2009 | Vitorino | H04M 1/2535 715/716 |
| 2010/0157980 A1* | 6/2010 | Ellsworth | H04L 67/24 370/352 |
| 2011/0183309 A1* | 7/2011 | Ochoa | G09B 19/00 434/365 |
| 2011/0234746 A1 | 9/2011 | Saleh | |
| 2011/0246880 A1* | 10/2011 | Horton | G06F 3/0481 715/708 |
| 2011/0314404 A1* | 12/2011 | Kotler | G06Q 10/109 715/772 |
| 2012/0062688 A1* | 3/2012 | Shen | H04N 7/15 348/14.03 |
| 2012/0077536 A1* | 3/2012 | Goel | H04L 65/4061 455/518 |
| 2012/0081615 A1* | 4/2012 | Starr | H04N 21/4222 348/734 |
| 2013/0179515 A1* | 7/2013 | Chi | H04L 29/06401 709/206 |
| 2013/0332218 A1* | 12/2013 | Chhatrapati | G06F 16/24547 705/7.19 |
| 2013/0343585 A1* | 12/2013 | Bennett | H04R 25/554 381/315 |
| 2014/0143196 A1* | 5/2014 | White | G06F 9/4856 706/46 |
| 2014/0211669 A1* | 7/2014 | Park | H04M 3/4938 370/271 |
| 2014/0272905 A1* | 9/2014 | Boersma | G09B 7/08 434/362 |
| 2014/0278647 A1* | 9/2014 | Rameshkumar | G06Q 10/06313 705/7.15 |
| 2015/0089466 A1* | 3/2015 | Rodgers | G06Q 10/06 717/102 |
| 2015/0254593 A1* | 9/2015 | Ramos Rinze | G06Q 10/06311 705/7.13 |
| 2016/0029905 A1* | 2/2016 | Kovacs | A61B 5/02055 600/301 |
| 2016/0099946 A1* | 4/2016 | Wiley | H04L 63/20 726/4 |
| 2016/0103903 A1* | 4/2016 | Vivalda | H04L 65/403 709/204 |
| 2016/0105472 A1* | 4/2016 | Chitroda | H04L 65/1063 709/204 |
| 2016/0142451 A1* | 5/2016 | Ouyang | H04L 65/403 715/728 |
| 2016/0306949 A1* | 10/2016 | Tallapaneni | H04W 12/0431 |
| 2017/0098284 A1* | 4/2017 | Schneider | G06Q 10/1095 |
| 2017/0155725 A1 | 6/2017 | Rincon | |
| 2017/0310716 A1* | 10/2017 | Lopez Venegas | G06Q 10/1093 |
| 2017/0352008 A1* | 12/2017 | Gao | G06Q 10/1097 |
| 2017/0358301 A1* | 12/2017 | Raitio | G10L 13/033 |
| 2018/0001205 A1* | 1/2018 | Osman | A63F 13/5375 |
| 2018/0005289 A1* | 1/2018 | Angell | G06Q 30/0613 |
| 2018/0048767 A1* | 2/2018 | Tinsman | H04M 1/6008 |
| 2018/0063206 A1* | 3/2018 | Faulkner | H04L 65/1093 |
| 2018/0101923 A1* | 4/2018 | Griesmann | H04W 64/00 |
| 2018/0189398 A1* | 7/2018 | Sternberg | G06Q 30/0272 |
| 2019/0052840 A1* | 2/2019 | Taylor | G06F 3/04842 |
| 2019/0129749 A1* | 5/2019 | White | G06Q 10/109 |
| 2019/0213509 A1* | 7/2019 | Burleson | G06Q 10/06393 |
| 2020/0043604 A1* | 2/2020 | Singh | A61B 90/70 |
| 2020/0135188 A1* | 4/2020 | Burgueno | G10L 15/26 |
| 2020/0193482 A1* | 6/2020 | Howard | G06Q 30/0267 |
| 2020/0313916 A1* | 10/2020 | Janakiraman | H04L 12/1827 |
| 2020/0314158 A1* | 10/2020 | Fardig | H04N 7/15 |
| 2021/0042638 A1* | 2/2021 | Novotny | H04L 67/535 |
| 2021/0058468 A1* | 2/2021 | Yu | H04L 67/18 |
| 2021/0342785 A1* | 11/2021 | Mann | G06F 16/9536 |
| 2021/0359872 A1* | 11/2021 | Deole | H04L 65/403 |
| 2021/0399911 A1* | 12/2021 | Jorasch | H04L 12/1822 |
| 2021/0400142 A1* | 12/2021 | Jorasch | H04N 21/2187 |

OTHER PUBLICATIONS

Disclosed Anonymously, et al., "SmartKeys: Context-Aware Keyboard Manipulation Indication, Prediction, Guidance and Recommendation", ip.com Prior Art Database Technical Disclosure, IPCOM000238316D, Aug. 18, 2014, 21 pgs.

* cited by examiner

GUIDED HARDWARE INPUT PROMPTS

BACKGROUND

The present invention relates generally to the field of guided hardware input prompts, and more particularly to notifying a user of a hardware input prompt based on communications in a communication software.

Communication software provides a remote communication system for two or more users called a conference. These communication systems are software based and can either be located on the computer of the user or in the cloud (i.e., web based). Communication software can allow for simple controls such as, turning microphone volume up or down, muting one or more members of the conference, sharing the user interface (i.e., screen) of one user with the other members of the conference. Often, communications are done in audio and/or video.

SUMMARY

Embodiments of the present invention include a computer-implemented method, computer program product, and system for alerting one or more users of hardware input prompts in a software based conference. In one embodiment, two or more computing devices involved in a software based conference are determined. Each computing device of the two or more computing devices has an associated user. An input from a computing device of the two or more computing devices is received. A user action for a user associated with a computing device of the two or more computing devices from the input is determined. Whether the user completed the user action within a threshold is determined. The user is alerted of the user action.

DETAILED DESCRIPTION

The present invention provides a method, computer program product, and computer system for determining optimized locations for alerting one or more users of hardware input prompts in a software based conference. Embodiments of the present invention recognize that software based conference systems can be provide interactive challenges for users who may not be comfortable or experienced with using the software based conference system or may be new to the software based conference system. Embodiments of the present invention recognize that, by design, the software based conference provides for a person to be remote or in a location that is not the same as other people in the software based conference and therefore there may be challenges in communicating actions that are requested in the software based conference.

Embodiments of the present invention provide for physical guidance for software based conference remote content and consumption for users who may not have cognitive or other abilities necessary to follow guidance. Embodiments of the present invention provide making it easier for the user to use an unknown software based conference software during the conferences. Embodiments of the present invention provide for directing a user to actions to be performed that have not been performed, as requested, within a threshold period by providing one or more alerts to the user. Embodiments of the present invention provide for alerts that may be audible, visual, haptic, or any combination.

Figure 1:
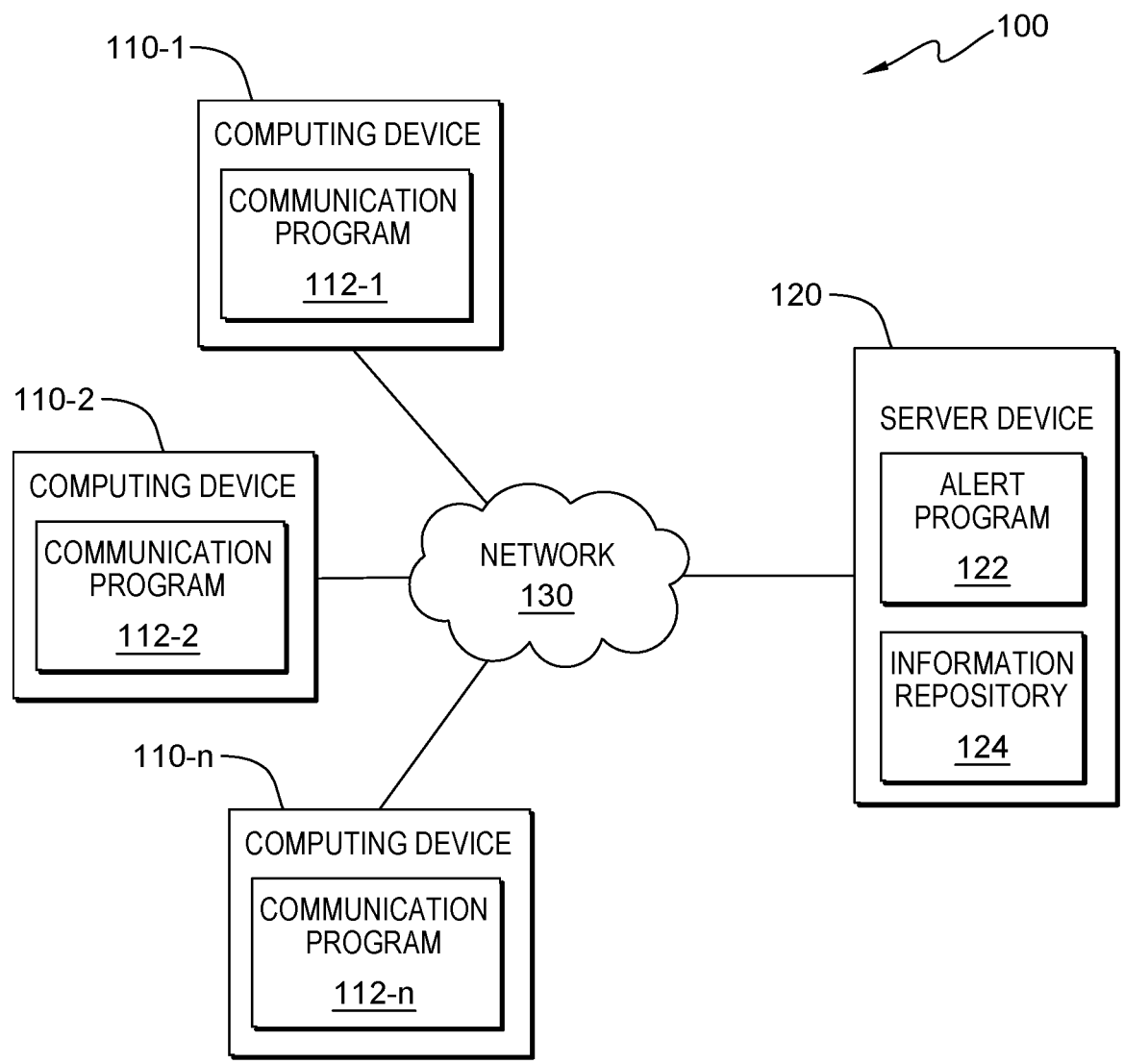
FIG. 1 is a functional block diagram of a network computing environment, generally designated 100, suitable for operation of alert program 122, in accordance with at least one embodiment of the invention.

Referring now to various embodiments of the invention in more detail, FIG. 1 is a functional block diagram of a network computing environment, generally designated 100, suitable for operation of alert program 122, in accordance with at least one embodiment of the invention. FIG. 1 provides only an illustration of one implementation and does not imply any limitation with regard to the environments in which different embodiments may be implemented. Many modifications to the depicted environment may be made by those skilled in the art without departing from the scope of the invention as recited by the claims.

Network computing environment 100 includes computing device 110-1, computing device 110-2, computing device 110-*n*, and server device 120, interconnected over network 130. In embodiments of the present invention, network 130 can be a telecommunications network, a local area network (LAN), a wide area network (WAN), such as the Internet, or a combination of the three, and can include wired, wireless, or fiber optic connections. Network 130 may include one or more wired and/or wireless networks that are capable of receiving and transmitting data, voice, and/or video signals, including multimedia signals that include voice, data, and video formation. In general, network 130 may be any combination of connections and protocols that will support communications between computing device 110-1, computing device 110-2, computing device 110-*n*, server device 120, and other computing devices (not shown) within network computing environment 100.

Computing device 110-*n* is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. For simplicity, computing device 110-*n* will be discussed in reference to any number of computing devices. For example, in a software based conference there may be ten participants and each participant may use their own computing device. Here, computing device 110-1, computing device 110-2, . . . , and computing device 110-10 may exist. In general, computing device 110-*n* represents any programmable electronic devices or combination of programmable electronic devices capable of executing machine readable program instructions and communicating with other computing devices (not shown) within computing environment 100 via a network, such as network 130.

In various embodiments of the invention, computing device 110-*n* may be a computing device that can be a standalone device, a management server, a web server, a media server, a mobile computing device, or any other programmable electronic device or computing system capable of receiving, sending, and processing data. In other embodiments, computing device 110-*n* represents a server computing system utilizing multiple computers as a server system, such as in a cloud computing environment. In an embodiment, computing device 110-*n* represents a computing system utilizing clustered computers and components (e.g., database server computers, application server computers, web servers, and media servers) that act as a single pool of seamless resources when accessed within network computing environment 100.

In an embodiment, computing device 110-*n* includes a user interface (not shown). A user interface is a program that provides an interface between a user and an application. A user interface refers to the information (such as graphic, text, and sound) a program presents to a user and the control sequences the user employs to control the program. There are many types of user interfaces. In one embodiment, a user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In an embodiment, computing device 110-*n* includes communication program 112-*n*. For simplicity, communication program 112-*n* will be discussed in reference to any number of communication programs. For example, in a software based conference there may be ten participants and each participant may use their own computing device with their own version of the communications software initialized. Here, communication program 112-1, communication program 112-2, . . . , and communication program 112-10 may exist.

Embodiments of the present invention provide for a communication program 112-*n* that allows for communication between two or more communication programs found on at least two or more computing device 110-*n*. In an embodiment, communication program 112-*n* allows for audio and/or visual communication with another communication program 112-*n* on other computing device 110-*n*. In an embodiment, each version of communication program 112-*n* may be the same software program. For example, each communication program 112-*n* may be program A. In an alternative embodiment, each version of communication program 112-*n* may be a different software program. For example, a first communication program 112-*n* may be program A and the second communication program 112-*n* may be program B. In this example, program A and program B have the ability to communicate with each other.

Server device 120 is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, server device 120 represents any programmable electronic devices or combination of programmable electronic devices capable of executing machine readable program instructions and communicating with other computing devices (not shown) within computing environment 100 via a network, such as network 130.

In various embodiments of the invention, server device 120 may be a computing device that can be a standalone device, a management server, a web server, a media server, a mobile computing device, or any other programmable electronic device or computing system capable of receiving, sending, and processing data. In other embodiments, server device 120 represents a server computing system utilizing multiple computers as a server system, such as in a cloud computing environment. In an embodiment, server device 120 represents a computing system utilizing clustered computers and components (e.g., database server computers, application server computers, web servers, and media servers) that act as a single pool of seamless resources when accessed within network computing environment 100.

In an embodiment, server device 120 includes a user interface (not shown). A user interface is a program that provides an interface between a user and an application. A user interface refers to the information (such as graphic, text, and sound) a program presents to a user and the control sequences the user employs to control the program. There are many types of user interfaces. In one embodiment, a user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In an embodiment, server device 120 includes alert program 122 and information repository 124. In an alternative embodiment, alert program 122 and information repository 124 may be located on computing device 110-*n* and/or integrated with communications program 112-*n*. For example, alert program 122 may be programmed to be integrated into communications program 112-*n* and alert program 122 may access information repository 124 that is located on computing device 110-*n*. In an embodiment, only one of alert program 122 and information repository 124 may be located on computing device 110-*n* and the other may be located on server device 120.

Embodiments of the present invention provide for an alert program 122 for alerting one or more users of hardware input prompts in a software based conference. In an embodiment, alert program 122 determines connections to the software based conference. In an embodiment, alert program 122 determines the actions that may occur in the software based conference. In an embodiment, alert program 122 receives inputs to the software based conference. In an embodiment, alert program 122 determines a user action based on the received inputs. In an embodiment, alert program 122 determines whether the action was performed by the user within a threshold. In an embodiment, alert program 122 alerts the user of the action.

In an embodiment, alert program 122 may use machine learning models that model relationships between user inputs and user actions associated with the user inputs. A machine learning model includes the construction and implementation of algorithms that can learn from and make predictions on data. The algorithms operate by building a model from example inputs in order to make data-driven predictions or decisions, rather than following strictly static program instructions. In an embodiment, the model is a system which explains the behavior of some system, generally at the level where some alteration of the model predicts some alteration of the real-world system. In an embodiment, a machine learning model may be used in a case where the data becomes available in a sequential fashion, in order to determine a mapping from the dataset to corresponding labels. In an embodiment, the goal of the machine learning model is to minimize some performance criteria using a loss function. In an embodiment, the goal of the machine learning model is to minimize the number of mistakes when dealing with classification problems. In yet another embodiment, the machine learning model may be any other model known in the art. In an embodiment, the machine learning model may be a SVM "Support Vector Machine". In an alternative embodiment, the machine learning model may be any supervised learning regression algorithm. In yet another embodiment, the machine learning model may be a neural network.

In an embodiment, alert program 122 may be trained using the machine learning algorithm based on listening to what a user says, and watching for input interaction through various peripherals or screen interactions on computing device 110-n. In an embodiment, alert program 122 may use natural language processing (NLP) in order to analyze communications found in a software based conference. In an embodiment, alert program 122 may use NLP in order to determine at least part of a communication in a software based conference is related to an action a user may perform. In an embodiment, NLP processing of speech is used to understand a command is given and the association of a command and the relationship with that command and the user interacting with the computing device 110-n is learned. In an embodiment, alert program 122 learns this by clustering and cluster association of commanding statements, and if a commanding statement and a strong association with that statement or a variation of that statement with an input interaction on computing device 110-n. For example, clicking the unmute button or the spacebar being touched may be associated with communications being used and as a historical corpus is generated it may be later used to classify later chunks of similar text and provide UI and input peripheral device alerts.

In an embodiment, server device 120 includes information repository 124. In an embodiment, information repository 1234 may be managed by alert program 122. In an alternative embodiment, information repository 124 may be managed by the operating system of server device 110, another program (not shown), alone, or together with, alert program 122. Information repository 124 is a data repository that can store, gather, and/or analyze information. In some embodiments, information repository 124 is located externally to server device 120 and accessed through a communication network, such as network 130. In some embodiments, information repository 124 is stored on server device 120. In some embodiments, information repository 124 may reside on another computing device (not shown), provided information repository 124 is accessible by server device 120. In an embodiment, information repository 124 may include data, including, but not limited to users and their computing device in a software based conference (connections), inputs for the software based conference, one or more thresholds for user actions, machine learning models, etc.

Information repository 124 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 124 may be implemented with any suitable storage architecture known in the art, such as a relational database, an object-oriented database, or one or more tables.

Figure 2:
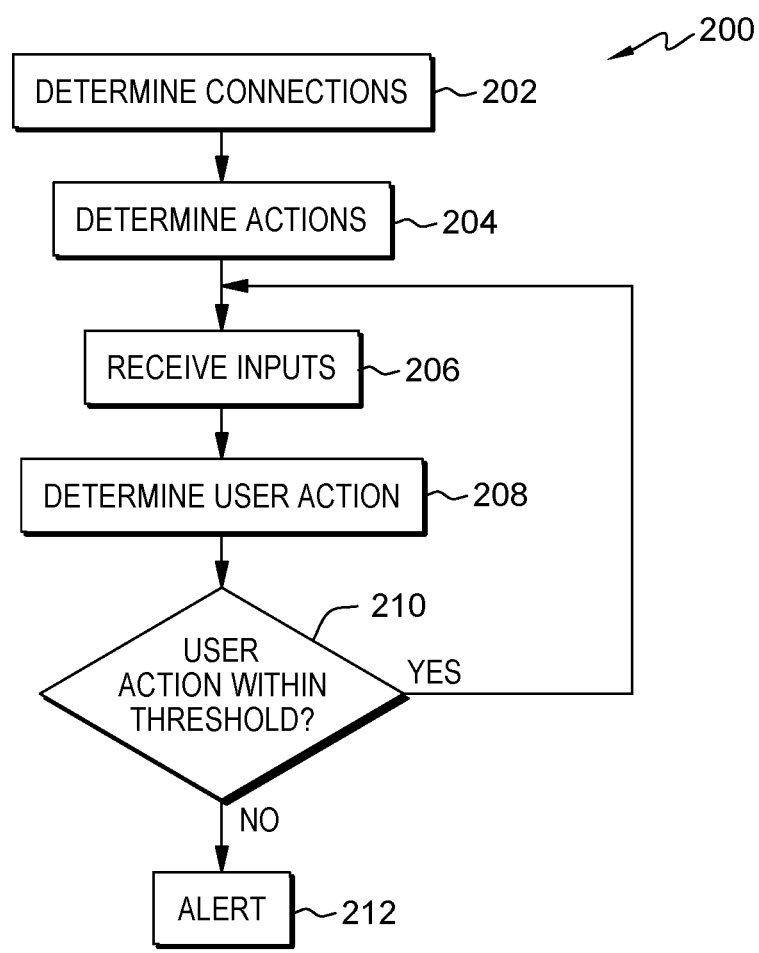
FIG. 2 is a flow chart diagram depicting operational steps for alert program 122 for alerting one or more users of hardware input prompts in a software based conference, in accordance with at least one embodiment of the invention.

FIG. 2 is a flow chart diagram of workflow 200 depicting operational steps for alert program 122 for alerting one or more users of hardware input prompts in a software based conference in accordance with at least one embodiment of the invention. In an alternative embodiment, the steps of workflow 200 may be performed by any other program (not shown) while working with alert program 122. It should be appreciated that embodiments of the present invention provide at least for alerting one or more users of hardware input prompts in a software based conference. However, FIG. 2 provides only an illustration of one implementation and does not imply any limitations with regard to the environments in which different embodiments may be implemented. Many modifications to the depicted environment may be made by those skilled in the art without departing from the scope of the invention as recited by the claims. In a preferred embodiment, a user, via a user interface (not shown), can invoke workflow 200 upon a user wanting alert program 122 to monitor communications within a software based conference between two or more users and provide alerts when a user does not perform a specific action within a threshold period of time. In an embodiment, alert program 122 may be found directly on the computing device 110-n of the user. In an embodiment, alert program 122 may be integrated with and/or part of communication program 112-n. In other words, some and/or all of the functions of alert program 122 discussed below may performed by communication program 112-n.

Alert program 122 determines connections (step 202). At step 202, alert program 122 receives data from one or more of computing device 110-n, and more specifically their associated communications program 112-n, regarding the computing devices and/or users in the software based conference. In an embodiment, alert program 122 may receive an indication of computing device 110-n being included in the software based conference and alert program 122 may query information repository 124 to determine the user and or users that are associated with computing device 110-n. In an alternative embodiment, alert program 122 may receive an indication of a user that is part of the software based conference and the computing device 110-n they are using to participate. In an embodiment, alert program 122 may receive the connection information at the start of a software based conference. In an embedment, alert program 122 may receive connection information in real time as the software based conference occurs. For example, as users join or leave the software based conference based on their associated computing device 110-n joining or leaving the software based web conference via their associated communications program 112-n. For example, user A is using communications program A on computing device A to communicate with user B using communications program B on computing device B and user C using communications program C on computing device C.

Alert program 122 determines actions (step 204). At step 204, alert program 122 determines a list of possible actions that can occur in the software based conference. In an embodiment, the list of possible actions may be predetermined and input by a user. For example, an action may include, but not limited to, "turn up your volume", "unmute your connection", "mute your connection", "turn on your video", etc., or any other language form of the example actions shown here. In an embodiment, the determined actions may also be actions determined during subsequent steps based on natural language processing. In an embodiment, the determined actions may be based on the abilities of the computing device 110-n and determined based on metadata and enabling instructional hardware of computing device 110-*n* stored in information repository 124. Continuing the example above, communications program B on computing device B may use the space bar to mute communications program B and communications program C on computing device C may use the right mouse click input to mute communications program C.

Alert program 122 receives inputs (step 206). At step 206, alert program 122 receives inputs from any of computing device 110-*n* involved in the software based conference. In an embodiment, alert program 122 may receive textual, audio and/or video input data from any of computing device 110-*n* involved in the software based conference. In an embodiment, alert program 122 performs natural language processing on the input stream in order to determine the content of the inputs. For example, the input may be from a communication program 112-*n* on computing device 110-*n* requesting the other communication programs in the software based conference turn on their videos. Continuing the example above, audio and/or video data streams may be received from communications program A on computing device A, communications program B on computing device B, and communications program C on computing device C.

Alert program 122 determines user actions (step 208). At step 208, alert program 122 links determined inputs in step 206 to determined actions from step 204. In an embodiment, alert program 122 determines which user/communications program 112-*n*/computing device 110-*n* should perform the action for the determined inputs. Continuing the example above, User A may say "Everyone turn on their videos" and alert program 122 determines that User B via communications program B on computing device B and User C via communications program C on computing device C need to turn the video recording devices on that are associated with their respective computing device 110-*n*. In another example continuing the example above, User A may say "User C please share your screen" and alert program 122 determines that User C via communications program C on computing device C needs to interact with the user interface button to share screen with communications program 112-*n*.

Alert program 122 determines whether there is the user action within a threshold (decision step 210). In an embodiment, alert program 122 determines whether the determined action of step 208 occurs within a threshold. In an embodiment, the threshold may be a threshold period of time. For example, did the user action occur before five seconds. In an alternative embodiment, the threshold may be a threshold number of user actions. For example, did the user action occur before attempting five other actions. In this embodiment, alert program 122 may be able to determine whether the user is attempting to do an action but incorrectly doing another action. In yet another embodiment, the threshold may be a threshold number of requests by the original user for the user to perform the action. For example, did user D request user E to mute themselves five times and user E still has not muted themselves. In an embodiment, if alert program 122 determines the user action has not been performed within a threshold (decision step 210, no branch), processing proceeds to step 212. In an embodiment, if alert program 122 determines the user action has been performed within a threshold, (decision step 210, yes branch), processing proceeds to step 206. Continuing the example above, did each of the User B or User C turn on their videos within five second. Continuing the other example above, did User C share their screen within five attempts of user input on computing device C.

Alert program 122 provides an alert (step 212). At step 212, alert program 122 alerts the user, via the user interface of computing device 110-*n* and communication program 112-*n*. In other words, alert program 122 determines the user that has not performed the user action within the threshold, and alert program 122 provides the alert to computing device 110-*n* which is the computing device of the user that had not performed the user action within the threshold. In an embodiment, the alert may be audible, visual, or a combination of both. For example, the alert program may indicate to the communication program 112-*n* to make an audio noise saying "unmute yourself". In another example, the alert program may provide visual indications including, but not limited, flashing text or a flashing box around the user interface location that can perform the input (unmute or mute button being outline in a flashing red box for example). In another example, the space bar on the keyboard of the user (which controls mute and unmute functions of communication program 112-*n*) may change colors or flash. In an embodiment, alert program 122 may indicate to computing device 110-*n* to move communication program 112-*n* to the "front" of the user interface and "above" all other open programs on the user interface of computing device 110-*n*. In an embodiment, the alert may be haptic to a device (not shown) that is connected to computing device 110-*n* via hardwire or wireless. For example, a keyboard or mouse connected wired or wirelessly to computing device 110-*n*. In another example, a smart watch of the user that is connected wirelessly to computing device 110-*n*.

A few examples of alert program 122 are shown below.

In a first example, a kindergarten teacher helps her class get setup on their science lesson today. One of the kids (Timmy) accidentally starts sharing their screen and cannot get it to stop sharing. The teacher asked Timmy to stop sharing his screen however Timmy has not stopped sharing his screen. After a second elapses of Timmy not stopping sharing his screen, the keyboard hot key lights up, by alert program 122 determining that the user action has not occurred within a threshold and therefore must alert the user, to show Timmy the correct keyboard shortcut to stop sharing immediately.

In a second example, a participant joins a conference call on a platform which they are not familiar. Here, the participant is asked to present to others, where S/he has to present, speak and wants to turn on the camera for the presentation. But by default, these options are disabled. Since the platform is new to the participant, it takes couple of seconds in some case minutes before participant/speaker can figure out how to enable these options. This is also a challenge, when participant is presenting the slides and moving back and forth between two screens. Here, when a presenter is asked to present or unmute, alert program 122 determines the action has not occurred within a threshold and therefore must alert the user by the quick highlighting of the keyboard to assist the presenter to immediately take action without having to go back and forth between screens or trying to figure out the actions on the screen in a new platform.

In a third example, a family member trying to setup a family screen chat for the virtual family reunion and there are 7 different locations from which family members are joining. Three of the locations are people who are not familiar with the video conferencing software default settings and potentially muted themself upon entry accidently. When all family members arrive, the host (Patty), wants to make sure that everyone has their mic open and working. She asks everyone on the meeting to look at their keyboard to make sure they unmute themself. Here, when the family members are asked to unmute, alert program 122 determines the action has not occurred within a threshold and therefore must alert the family members by the quick highlighting of the keyboard to assist the family members to immediately take action of unmuting themselves.

In a fourth example, a non-native speaker calls a customer care representative via a software based conference. The representative is trying to troubleshoot the problem and asks the caller to share some information. Since, the caller is not technically astute and it is hard to understand the spoken language, representative asks them to start the screen share. But it is hard for the caller to know what is being asked. Here, alert program 122 determines the action has not occurred within a threshold and therefore must alert the user by the quick highlighting of the keyboard to assist the user to immediately take action of screen sharing.

Figure 3:
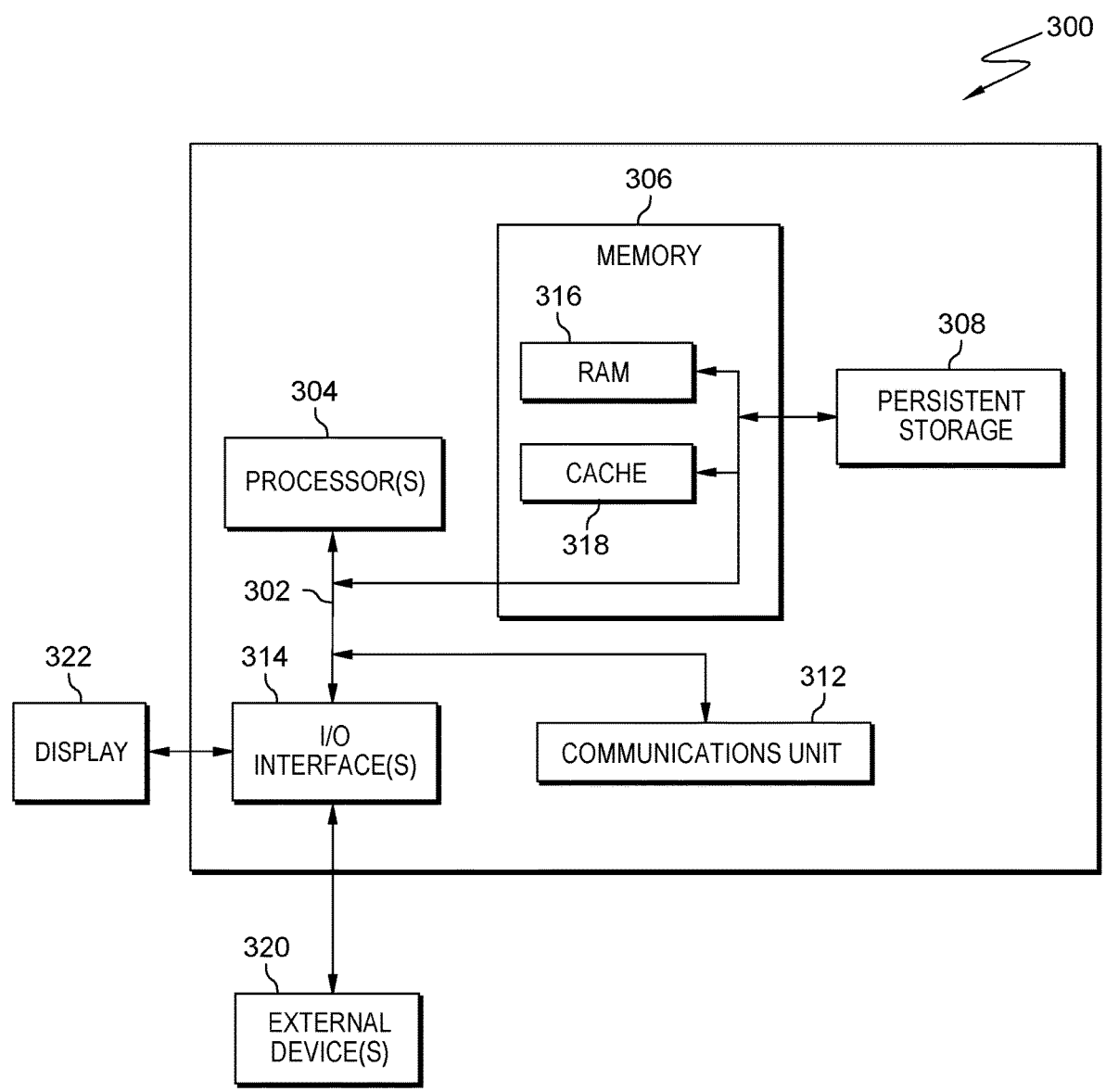
FIG. 3 is a block diagram depicting components of a computer, generally designated 300, suitable for executing communication program 112-*n* and alert program 122, in accordance with at least one embodiment of the invention.

FIG. 3 is a block diagram depicting components of a computer 300 suitable for alert program 122, in accordance with at least one embodiment of the invention. FIG. 3 displays the computer 300, one or more processor(s) 304 (including one or more computer processors), a communications fabric 302, a memory 306 including, a RAM 316, and a cache 318, a persistent storage 308, a communications unit 312, I/O interfaces 314, a display 322, and external devices 320. It should be appreciated that FIG. 3 provides only an illustration of one embodiment and does not imply any limitations with regard to the environments in which different embodiments may be implemented. Many modifications to the depicted environment may be made.

As depicted, the computer 300 operates over the communications fabric 302, which provides communications between the computer processor(s) 304, memory 306, persistent storage 308, communications unit 312, and input/output (I/O) interface(s) 314. The communications fabric 302 may be implemented with an architecture suitable for passing data or control information between the processors 304 (e.g., microprocessors, communications processors, and network processors), the memory 306, the external devices 320, and any other hardware components within a system. For example, the communications fabric 302 may be implemented with one or more buses.

The memory 306 and persistent storage 308 are computer readable storage media. In the depicted embodiment, the memory 306 comprises a random-access memory (RAM) 316 and a cache 318. In general, the memory 306 may comprise any suitable volatile or non-volatile one or more computer readable storage media.

Program instructions for alert program 122 may be stored in the persistent storage 308, or more generally, any computer readable storage media, for execution by one or more of the respective computer processors 304 via one or more memories of the memory 306. The persistent storage 308 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 312, in these examples, provides for communications with other data processing systems or devices. In these examples, the communications unit 312 may comprise one or more network interface cards. The communications unit 312 may provide communications through the use of either or both physical and wireless communications links. In the context of some embodiments of the present invention, the source of the various input data may be physically remote to the computer 300 such that the input data may be received, and the output similarly transmitted via the communications unit 312.

The I/O interface(s) 314 allow for input and output of data with other devices that may operate in conjunction with the computer 300. For example, the I/O interface 314 may provide a connection to the external devices 320, which may be as a keyboard, keypad, a touch screen, or other suitable input devices. External devices 320 may also include portable computer readable storage media, for example thumb drives, portable optical or magnetic disks, and memory cards. Software and data used to practice embodiments of the present invention may be stored on such portable computer readable storage media and may be loaded onto the persistent storage 308 via the I/O interface(s) 314. The I/O interface(s) 314 may similarly connect to a display 322. The display 322 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, though the Internet using an Internet Service Provider). In some embodiments, electronic circuitry including, for example programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram blocks or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing form the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for alerting one or more users of hardware input prompts in a software based conference, the computer-implemented method comprising:
    determining, by one or more computer processors, two or more computing devices involved in a software based conference, wherein each computing device of the two or more computing devices has an associated user;
    receiving, by one or more computer processors, an input from a first computing device of the two or more computing devices;
    determining, by one or more computer processors, a user action for a user associated with a second computing device of the two or more computing devices based on the input, wherein the user action is a hardware input on the second computing device;
    determining, by one or more compute processors, whether the user completed the user action within a threshold amount of user action hardware inputs; and
    responsive to determining the user did not complete the action within the threshold, alerting, by one or more computer processors, the user of the user action.

2. The computer-implemented method of claim 1, wherein the user action is determined using natural language processing on a communication in the software based conference.

3. The computer-implemented method of claim 1, wherein the input is selected from the group consisting of text, audio and video.

4. The computer-implemented method of claim 1, wherein the threshold is a time period.

5. The computer-implemented method of claim 1, wherein the alert is an audio noise describing the user action.

6. The computer-implemented method of claim 1, wherein the alert is a visual flashing around a button on a user interface of a computing device for the user action.

7. A computer program product for alerting one or more users of hardware input prompts in a software based conference, the computer program product comprising:
one or more computer readable storage media; and
program instructions stored on the one or more computer readable storage media, the program instructions comprising:
program instructions to determine two or more computing devices involved in a software based conference, wherein each computing device of the two or more computing devices has an associated user;
program instructions to receive an input from a first computing device of the two or more computing devices;
program instructions to determine a user action for a user associated with a second computing device of the two or more computing devices based on the input, wherein the user action is a hardware input on the second computing device;
program instructions to determine whether the user completed the user action within a threshold amount of user action hardware inputs; and
responsive to determining the user did not complete the action within the threshold, program instructions to alert the user of the user action.

8. The computer program product of claim 7, wherein the user action is determined using natural language processing on a communication in the software based conference.

9. The computer program product of claim 7, wherein the input is selected from the group consisting of text, audio and video.

10. The computer program product of claim 7, wherein the threshold is a time period.

11. The computer program product of claim 7, wherein the alert is an audio noise describing the user action.

12. The computer program product of claim 7, wherein the alert is a visual flashing around a button on a user interface of a computing device for the user action.

13. A computer system for alerting one or more users of hardware input prompts in a software based conference, the computer system comprising:
one or more computer processors;
one or more computer readable storage media; and
program instructions, stored on the one or more computer readable storage media for execution by at least one of the one or more computer processors, the program instructions comprising:
program instructions to determine two or more computing devices involved in a software based conference, wherein each computing device of the two or more computing devices has an associated user;
program instructions to receive an input from a first computing device of the two or more computing devices;
program instructions to determine a user action for a user associated with a second computing device of the two or more computing devices based on the input, wherein the user action is a hardware input on the second computing device;
program instructions to determine whether the user completed the user action within a threshold amount of user action hardware inputs; and
responsive to determining the user did not complete the action within the threshold, program instructions to alert the user of the user action.

14. The computer system of claim 13, wherein the user action is determined using natural language processing on a communication in the software based conference.

15. The computer system of claim 13, wherein the input is selected from the group consisting of text, audio and video.

16. The computer system of claim 13, wherein the threshold is a time period.

17. The computer system of claim 13, wherein the alert is an audio noise describing the user action.

* * * * *